May 26, 1942.  P. HANSMANN  2,284,145
HITCH
Filed Jan. 4, 1939   2 Sheets-Sheet 1
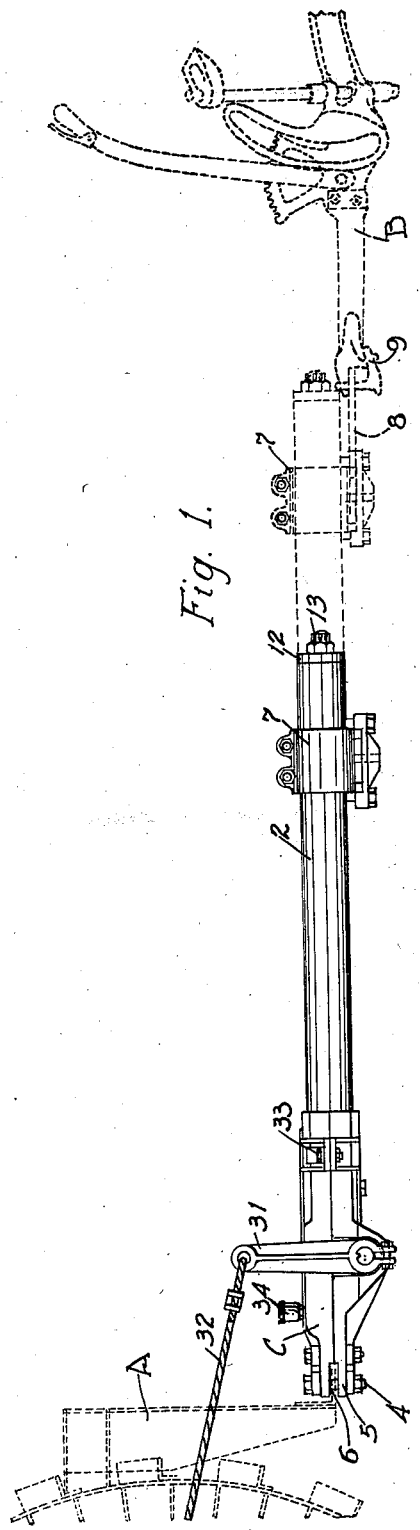
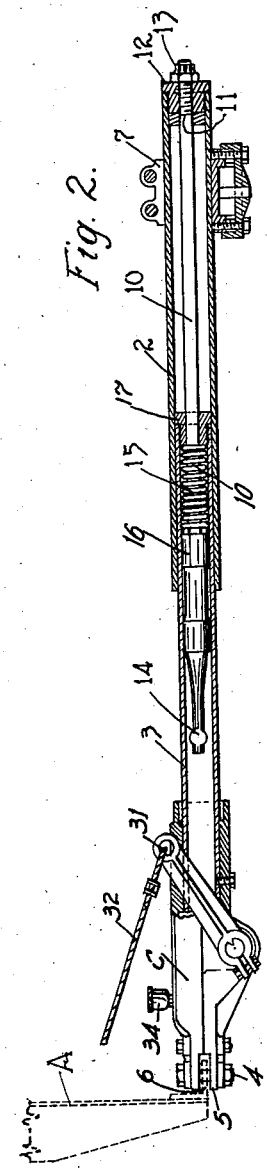
INVENTOR.
Paul Hansmann
BY
ATTORNEY

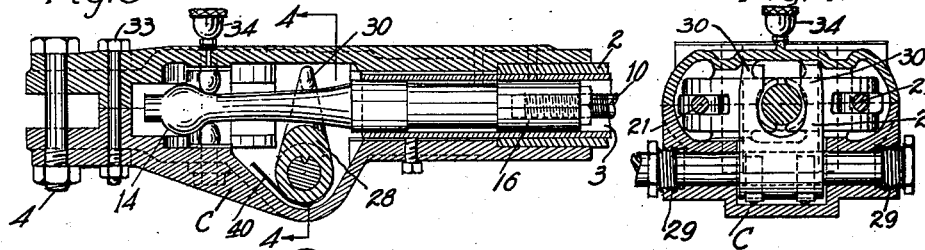
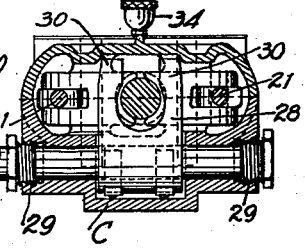
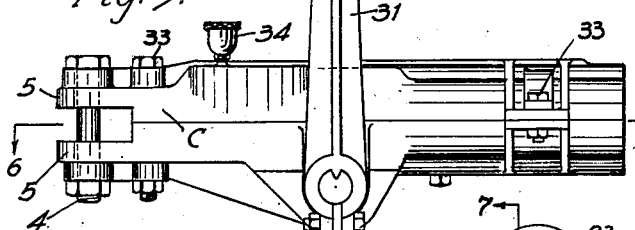
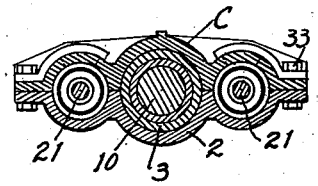
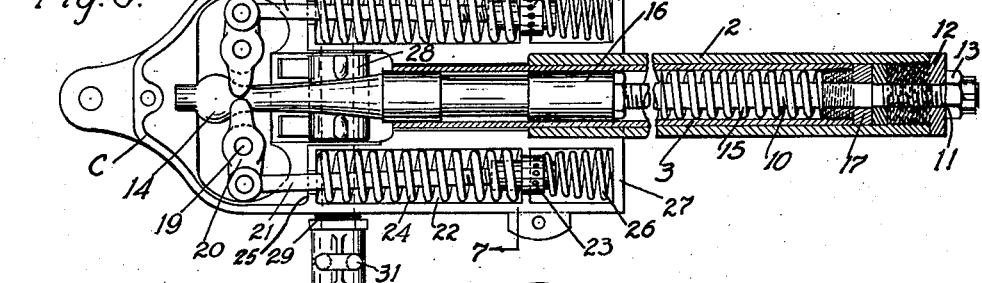
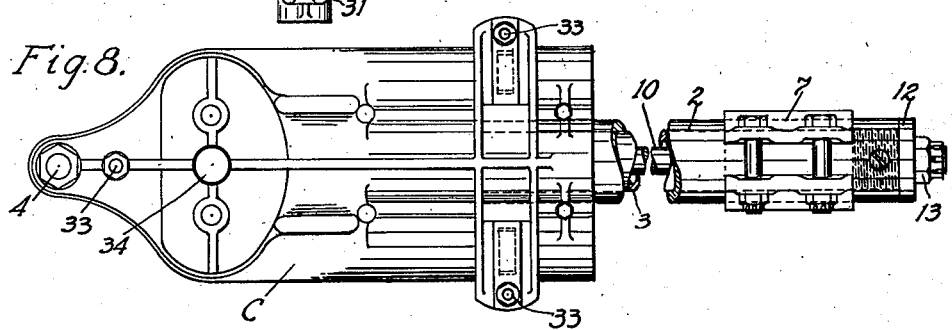

Patented May 26, 1942

2,284,145

UNITED STATES PATENT OFFICE 2,284,145

HITCH

Paul Hansmann, Long Prairie, Minn.

Application January 4, 1939, Serial No. 249,241

6 Claims. (Cl. 180—14.5)

The present invention relates to hitches for connecting draft means, as a tractor, with a drawn implement of the type wherein the hitch is automatically released where a predetermined pulling stress is encountered as through the drawn implement striking an obstacle.

An object of the invention is to provide a device of this character that will be simple in construction and effective in operation.

Among the features of improvement are adjustable spring means for holding the hitch members locked in retracted position, but permitting relative separation of the members in the encountering of a predetermined stress by the drawn implement; means actuated from the hitch member release means for stopping the forward travel of the draft means; means for protecting and keeping the working parts constantly oiled; means for cushioning the working parts of the hitch members in their separation, and other features of improvement that will be more particularly pointed out in the following description and the accompanying drawings, wherein:

Figure 1 is a view in side elevation of the invention shown connecting a tractor with a plow to be drawn, the device being shown in normal retracted position in full lines and in released position in dotted lines.

Figure 2 is a longitudinal sectional view through the device in released position.

Figure 3 is a vertical sectional view through the clutch end of the device, with the members in interlocking position.

Figure 4 is a sectional view on line 4—4 of Figure 3.

Figure 5 is a view in side elevation of the clutch end of the device.

Figure 6 is a horizontal sectional view through the device taken on line 6—6 of Figure 5.

Figure 7 is a sectional view on line 7—7 of Figure 6; and

Figure 8 is a top view of the device shown partly broken away.

Referring to the drawings in detail, A represents the draw member of a tractor, and B the draw bar of the implement to be drawn, as a plow.

The hitch comprises two telescoping tubular members, the outer member 2, as shown, being connected with the draw bar B, and the forward inner tubular member 3 being connected with the draw member A of the tractor.

In the construction shown, the forward tubular member is connected with the draw member of the tractor as by a bolt 4 passing through lips 5 carried by the supporting head C of the tube 3 and through a lip 6 carried by the draw member A, constituting a clevis connection between the end of the head C and the draw member. The outer or rear tube 2 is connected with the draw bar B, as by means of a collar 7 adjustably supported upon the tube 2 and connected underneath the tube with the draw bar by hook or clevis members 8 and 9, as the standard construction illustrated.

Forming a slidable connection between the tubes is a rod 10 having threaded support 11 at its outer end in a plug 12 threaded in the outer end of the tube 2, the rod being held secured in the end of the tube 2 as by a locknut 13. The inner end of the rod supports a spherical head 14 for a purpose to be hereinafter set forth.

The inner end of the tube 3 is formed with a head 17 through which the rod 10 slides. A coil spring 15 surrounds the rod 10 between the head 17 and a circumferential shoulder 16 upon the rod. The tube head 17 and the shoulder 16 together with the spring 15 prevents the rod being entirely pulled out of the tube 3, thus preventing complete separation of the tubes.

Having fulcrum support 19 in the outer portion of the head C is a pair of dogs 20 adapted to normally be held in locking position back of the head 14 of the rod, as shown particularly in Figure 6. The outer ends of the dogs are pivotally connected with rods 21 slidable in oil chambers 22.

Having threaded support inside the oil chambers upon each rod 21 is an adjusting nut 23, a relatively heavy pressure coil spring 24 surrounding the rod between the adjusting nut 23 and the outer wall 25 of the oil chamber, and a compression spring 26 surrounding the rod between the nut 23 and the rear wall 27 of the head C constituting the rear wall of the oil chamber.

The coil springs 24 normally hold the locking dogs in the locking position shown in Figure 6 and are adjustable in tension by the nut 23. The springs 26 act to bring the dogs against head 14 when the head passes the dogs upon reassembly of the parts, said springs 26 further acting as a cushion.

For the purpose of shutting off the motive power following the releasing of the rod 10 from the dogs 20, an arm 28 has fulcrum supports 29 in the head C below the rod head 14 of the rod. The end of the arm is formed with spaced inwardly projecting fingers 30 to be engaged by the head 14 of the rod after the rod has been released from the dogs in the outward sliding of the rod, to bring about the desired swinging of the arm upon its fulcrum. Supported upon the fulcrum 29 outside of the head is an upwardly extending arm 31 connected by a cord 32 with the clutch mechanism of the tractor, not shown.

The head C is preferably formed of upper and lower halves, as shown, connected as by bolts and nuts 33 securing the halves together upon the tube 3. 34 indicates a suitable oil cup for the head C.

In operation, with the tubes in a normally telescoped position the head 14 of the rod will stand outwardly of the dogs 20, holding the tubes against any relative separation. When a stress beyond a certain degree, controlled by the tension of the spring 24, is encountered by the drawn implement, the dogs will be turned out of locking engagement with the head of the rod by the pull upon the rod, allowing the tubes to be relatively separated, as shown in Figure 2, allowing the tractor to move forward the distance the tube members are separated, or unless the motive power is previously shut off, releasing the pulling stress upon the drawn implement.

As the head of the rod is drawn away from the dogs it will strike the fingers 30 carried by the end of the lever arm 28, swinging the lever arm rearwardly to actuate the exterior lever arm 31 and through the cord connection 32 with the clutch mechanism of the motor, shut off the power. As the lever arm is thus swung by the engagement of the head of the rod with the fingers 30, the head will pass the said fingers in a continued withdrawal of the rod. The operation of the tractor being thus stopped and the obstruction properly attended to by the operator it will merely be necessary to back the tractor toward the drawn implement, sliding the tubes together and bringing the rod into the locked position shown in Figures 3 and 6.

After the parts of the hitch have been relatively separated in the manner described, the arm 31 may remain in the position shown in Figure 2, or may be pulled back into the vertical position illustrated in Figure 1 by the weight of the cable 32. The clutch is of the type which will remain in engaged or disengaged position. As the clutch must be manually moved to engaged position before the tractor can be reversed to telescope the hitch members together, the lever 31 will be drawn into erect position shown in Figure 1 during resetting of the clutch. As the enlargement 14 moves past the lever 31 it engages the arm 28 and the fingers 30 pivot in a counter-clockwise direction from the position illustrated in Figure 3. A spring 40 is compressed by this counter-clockwise movement of the arm 28 and this spring 40 returns the arm 28 and the associated arm 31 into the vertical position shown in Figures 1 and 3 after the enlargement 14 passes the arm 28.

Among the many advantages of the construction is the sealing of the working parts through the combination of the slidable, telescoping tubes and associated hollow head C, which affords oil containing chambers so that the working parts may be kept working in the lubricant and be protected from any exposure to the elements, etc. The chambers containing the controlling springs for the actuating dogs will be packed with the lubricant and the chamber containing the dogs further oiled through the supply cup 23, bringing about, as will be evident, a complete lubricating of the parts including the lubricating of the slidable rod within the tubes.

Other important features lie in the tripping mechanism for the motor clutch, which will be actuated immediately upon the withdrawal of the rod from the dogs, shutting off the motor power well in advance of the complete separating movement of the tubes. The cushioning spring means 15 for the rod prevents any injurious shock on the parts as the tubes are outwardly telescoped. By adjusting the regulating springs for the dogs through the nuts 23 a predetermination of the amount of stress upon the drawn implement that will release the locked parts is arranged for.

I claim:

1. In combination with draft means and an implement to be drawn, a connecting hitch comprising slidably connected tubular members, a hollow head supported by the end of one of said members, said members and head forming a lubricant holding means to lubricate any contained parts, a rod having fixed support within the other member and projectable into said head upon the inward telescoping of said members, an enlargement at the free end of said rod, dogs supported in said head and engaging with said rod at the rear of said enlargement in an inwardly telescoping position of said members, and spring means holding said dogs in engagement with the rod back of said enlargement in an inwardly telescoped position of said members.

2. In combination with draft means having a movement controlling clutch and an implement to be drawn, a connecting hitch comprising slidably connected tubular members, a hollow head supported at the outer end of one of said members, a rod having fixed support within the other member and projectable into said head upon the inward telescoping of said members, an enlargement carried by the free end of said rod, dogs pivotally supported in said head and engaging with said rod at the rear of said enlargement in a telescoping together of the members, spring means holding said dogs in engagement with the rod in an inwardly telescoping position of the members and trip means pivotally supported rearwardly of said dogs in the path of movement of the enlargement of said rod, said trip means being engageable by said enlargement in a relative separation of the telescoping members, and means connecting said trip means to said clutch for the purpose set forth.

3. In combination with a tractor having a clutch and a drawn implement of a hitch connecting the tractor with the drawn implement comprising telescopingly connected tubular members, one connected with the tractor and one with the drawn implement, a rod secured within one member and projectable into the other member upon a telescoping together of the members, dogs pivotally supported upon the other member adjacent the free end of said rod, spring means for holding the dogs in engagement with the rod, an abnormal stress on the drawn implement acting to disengage said dogs from said rod and allowing a relative separation of the two members, clutch release means carried by the hitch and operable upon relative separation of said telescopingly connected tubular members, and a connecting means between said clutch and said clutch release means.

4. In combination with a tractor having a clutch and a drawn implement of a hitch connecting the tractor with the drawn implement comprising telescopingly connected tubular members, one connected with the tractor and one with the drawn implement, a rod secured within one member and projectable into the other member upon a telescoping together of the members, dogs pivotally supported adjacent the free end of said rod, spring means for holding the dogs in engagement with the rod, an abnormal stress on the drawn implement acting to disengage said dogs from said rod and allowing a relative separation of the two members, means for automatically restoring the interlocked position of tubular members upon an inward telescoping of said members, clutch release means carried by the hitch and operable upon relative separation of said telescopingly connected tubular members, and a connecting means between said clutch and said clutch release means.

5. In combination with a tractor having a clutch and a drawn implement of a hitch connecting the tractor with the drawn implement comprising telescopingly connected tubular members, one connected with the tractor and one with the drawn implement, a rod secured within one member and projectable into the other member upon a telescoping together of the members, dogs pivotally supported adjacent the free end of said rod, spring means for holding the dogs in engagement with the rod, an abnormal stress on the drawn implement acting to disengage said dogs from said rod and allowing a relative separation of the two members, and trip means including a trunnion supported at the rear of said dogs and a lever arm supported by said trunnion and connected with the clutch mechanism of the tractor, said trunnion being provided with means engageable by the enlarged head of said rod in the outward withdrawal of said rod to turn said arm to operate the clutch mechanism for the purpose set forth.

6. In combination with a tractor having a clutch and a drawn implement, of a hitch connecting the tractor with the drawn implement comprising telescopingly connected tubular members, one connected with the tractor and one with the drawn implement, a rod secured within one member and projectable into the other member upon a telescoping together of the members, dogs pivotally supported adjacent the free end of said rod, spring means for holding the dogs in engagement with the rod, an abnormal stress on the drawn implement acting to disengage said dogs from said rod and allowing a relative separation of the two members, means for adjusting the tension of the controlling springs for said dogs, clutch release means carried by the hitch and operable upon relative separation of said tubular members, and a connecting means between said clutch and said clutch release means.

PAUL HANSMANN.